E. T. GRAY & A. T. HOEVET.
AUTOMOBILE SIGNAL.
APPLICATION FILED APR. 14, 1914. RENEWED JAN. 3, 1916.
1,193,379.
Patented Aug. 1, 1916.
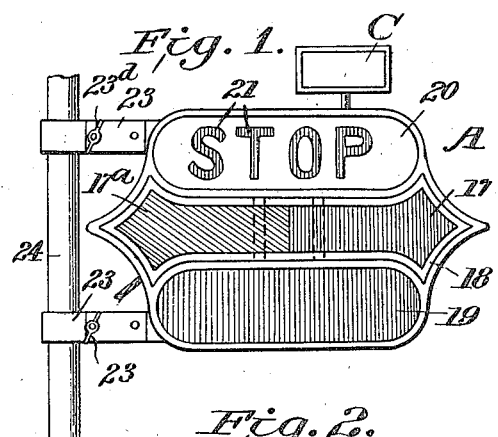
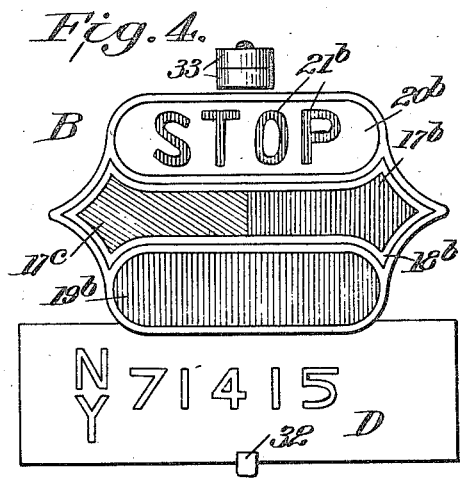
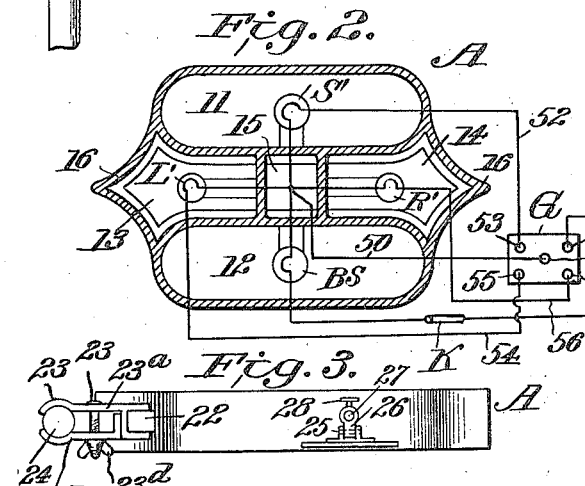
Witnesses
C. H. Walker
E. Williams
Inventors
E. T. Gray
A. T. Hoevet
By Frederick V. Winters
Attorney

UNITED STATES PATENT OFFICE.

EDWIN T. GRAY AND ALFRED T. HOEVET, OF NEW YORK, N. Y.

AUTOMOBILE-SIGNAL.

1,193,379.   Specification of Letters Patent.   Patented Aug. 1, 1916.

Application filed April 14, 1914, Serial No. 831,826. Renewed January 3, 1916. Serial No. 70,081.

*To all whom it may concern:*

Be it known that we, EDWIN T. GRAY and ALFRED T. HOEVET, citizens of the United States, residing at New York, in the county and State of New York, have invented a new and useful Automobile-Signal, of which the following is a full, clear, and exact specification.

This invention relates to automobile signals and especially to illuminated signals to be used at night for indicating the intended movements of automobiles or other vehicles.

One object of the present invention is to provide an improved and simplified system of signals by means of which an intention to stop or turn to either the right or left can be indicated at both sides of the vehicle and also at the rear thereof by simply turning a switch in easy reach of the driver.

Another object is to provide a constantly burning tail light in combination with the rear signal lamp, and warning lights in combination with each of the side lamps, which warning lamps are dark as long as the tail light is burning but which will be automatically lighted whenever the tail light is extinguished, thereby notifying the driver that trouble exists in the tail light and at the same time providing warning lights at the sides of the vehicle visible at the rear to serve in place of the tail light until the latter is repaired.

A further object is to provide a combined tail light and signal which also constitutes or includes means for removably supporting and illuminating the license number plate.

Other objects will become apparent as the description proceeds.

The invention will be first hereinafter described in connection with the accompanying drawings, which constitute a part of this specification, and then more specifically defined in the claims at the end of the description.

In the accompanying drawings, wherein similar reference characters are used to designate corresponding parts throughout the several views: Figure 1 is a rear elevation of one of the side signal boxes. Fig. 2 is a longitudinal vertical sectional view of the same, the circuits from the lamps in the four compartments in said box to the corresponding plug block being indicated diagrammatically. Fig. 3 is a top plan view of said signal box. Fig. 4 is a rear elevation of the rear signal box and the license number plate supported thereby. Fig. 5 is a front elevation of the parts shown in Fig. 4. Fig. 6 is a side elevation, partly in section, of said rear signal box. Fig. 7 is a diagrammatic view of the circuits to the several signal boxes. Fig. 8 is a detail perspective view of the solenoid controlled knife switch which is carried in the rear signal box, the circuits which include said solenoid and knife switch, respectively, being indicated diagrammatically, and Fig. 9 is a longitudinal vertical sectional view of a signal box of modified construction having a larger number of compartments than those shown in the other views.

In carrying out our invention, it will be understood that one of the signal boxes illustrated in Figs. 1, 2 and 3 is attached to each side of the automobile or other vehicle, preferably at the dash board, while the signal box illustrated in Figs. 4, 5 and 6 is attached to the back of the vehicle.

Each of the side signal boxes A is divided into four signal or lamp compartments 11, 12, 13 and 14. The upper and lower compartments 11 and 12, respectively, are separated by the left and right compartments 13 and 14, and also by a central compartment 15 for the distribution of the electric wires as hereinafter explained. Each of the compartments 13 and 14 has its end wall extended and pointed, as at 16, and the ends of the upper and lower compartments are rounded so as to give to said left and right compartments 13 and 14 the shape of arrows pointing respectively to the left and right. Both front and rear faces of the compartment 14 are covered with red glass or other transparent material 17, while the corresponding faces of the compartment 13 have green panes 17ª, and in order to make the arrows stand out more distinctly, they are edged by clear glass or other suitable material, as at 18. The bottom compartment 12 is also faced with red glass or other suitable transparent material on both the front and rear, as indicated at 19 in Fig. 1. The top compartment 11 is covered on both front and rear faces alike with opaque material 20 having clear red letters 21 spelling the word "Stop." It will thus be seen that the side signal boxes will appear exactly alike from both front and rear, so that any signal flashed therefrom will be seen by vehicles and pedestrians in both directions.

The side signal boxes may have lugs 22 cast thereon or otherwise secured thereto, and clamps 23 attached to said lugs are used to fasten said signal boxes to a part of the frame of the vehicle as indicated at 24. One member 23ª of said clamp is secured to the lug 22 in the preferred form shown, while the other member 23ᵇ is separate from the lug and adjustably secured to the member 23ª by a bolt 23ᶜ headed at one end and carrying a winged nut 23ᵈ at its other end, as shown in Figs. 1 and 3.

A mirror C may be adjustably mounted on top of one or both of the side boxes as also shown in Figs. 1 and 3. As there illustrated, the mirror is provided with parallel rearwardly projecting lugs 25 riveted to and frictionally engaging opposite sides of a lug 26 which is drilled to fit around a post 27 tapped into the top of the box. The frictional engagement between the lugs 25 and lug 26 permits the mirror to be tilted at any desired angle, while the lug 26 may be fastened to the post at any desired height by means of a set screw 28.

The back signal box B is shaped like the side signal boxes and is provided with corresponding compartments, the bottom compartment having a rear red pane 19ᵇ, the side compartments having red and green panes 17ᵇ and 17ᶜ, respectively, with clear borders 18ᵇ, and the top compartment having an opaque rear pane 20ᵇ with transparent red letters 21ᵇ spelling the word "Stop." The front of this back signal box is entirely closed. The bottom compartment 12ᵇ of the rear box is fitted with a pane of clear glass or other suitable material 29 in order to throw light onto the license number plate D which is supported below said back signal box in the following manner: To the front of the box B there are secured two short vertically bored lugs 30 and a long vertically bored lug 31, all arranged in vertical alinement with one another. A rod 31ª, having a hook 32 on its lower end and screw threads on its upper end, is passed through said lugs and is fitted with lock nuts 33 on its upper end abutting against the upper short lug 30. At either side of said rod and near the lower edge of the box B, downwardly turned lugs 34 are rigidly secured to the front of said box. The license number plate D is placed above the hook 32 at the lower end of the rod 31, and below the lugs 34 on the box B, and secured in that position by turning down the nuts 33, as will be readily understood. The long lug 31 has a second vertical bore 35 which is preferably tapered and is adapted to be placed over any suitable bracket on the back of the vehicle as indicated at 36 in Fig. 6, a set screw 37 being provided for tightening upon the bracket to hold the box rigidly thereon.

At some convenient place on the vehicle, a switch board E and controlling switch F are arranged, the latter being in easy reach of the driver. As indicated in Fig. 7, the switch board E contains three sets of five cavities or plug-holes, one set corresponding to each of the signal boxes, the left hand set corresponding to the left hand signal box, the right hand set corresponding to the right hand signal box, and the middle set corresponding to the back signal box. One cavity or plug-hole 38 in each set is connected electrically to a conductor or wire 39 connected to one pole of a battery or generator 40. The other pole of the battery is connected by a conductor or wire 41 to the arm of the switch F. Another one of the cavities or plug-holes, 42, in each set on the switch-board is connected to one of the contacts L on the switch by a wire 43, there being three contacts on said switch, one corresponding to each set of cavities in the switch-board. Another cavity 44 in each set is connected by a wire 45 to a contact S, while still another cavity 46 in each set is connected by a wire 47 with the third contact R on said switch. The only remaining cavity 48 in each set is connected by a wire 49 to the wire 41.

As illustrated in Fig. 2, there is an electric lamp located in each of the four compartments of each of the three signal boxes, the lamp in the top compartment being designated S′, the lamp in the left hand compartment being designated L′, and the lamp in the right hand compartment being designated R′. The lamp in the bottom compartment of each of the side signal boxes is designated BS, while the lamp in the bottom compartment in the rear signal box, Fig. 8, is designated BR. A plug G, having five pins to fit the five cavities of each set in the switch board, is connected to each of the signal boxes by a cable H. In each cable there are five wires insulated from one another. Said cable enters the center compartment 15 of each signal box. One of the wires 50 in said cable is split to connect to one pole of each of the lamps S′, L′, R′ and BS or BR, according to whether it is the side box or the rear box. This wire is connected to the central pin 51 of the plug, see Fig. 2. The other pole of the top lamp S′ is connected by a wire 52 to another one, 53, of the pins on the plug. The other pole of the lamp L′ is connected by a wire 54 to the pin 55 on the plug, while the other pole of the lamp R′ is connected by a wire 56 to the pin 57 on the plug. The remaining lamp BS in the side signal boxes has its other pole connected by a wire 58 to the pin 59 on the plug. In the rear lamp the other pole of the bottom lamp BR is connected by a wire 58ª to the pin on its plug corresponding to the pin 59 in Fig. 2. This wire 58ª is indicated in Fig. 8.

As also indicated in Fig. 8, the circuit to the lamps BS in the bottom compartments of the side signal boxes, includes a knife switch K which is located in the bottom compartment of the rear box. One member of this knife switch is pivoted to swing to and away from the other member and is normally held out of contact therewith by a solenoid J included in the circuit to the lamp BR in the bottom compartment of the rear box. In case the circuit to said lamp BR, which is burned constantly and serves as a warning light such as commonly used on the rear of automobiles, is broken so that this lamp goes out, the solenoid becomes dead and the pivoted member of the knife switch is moved into engagement with the other member of said switch, thereby closing the normally open circuit to the bottom lamps BS in the side signal boxes. Thus if the danger or tail lamp BR goes out, the driver is notified by the lighting of the bottom lamps BS of the side boxes. A switch K is placed in the circuits of said lamps BS and BR for cutting them all off in the daytime and switching them both on at night, it being understood that the circuit to the lamp BR is normally closed and the circuit to the lamps BS is normally open when said switch M is closed.

From the foregoing it will be seen that when the three plugs from the three signal boxes are inserted in the switch-board, the lamps in the several compartments of the three boxes may be turned on by means of the switch F. Thus, when the arm of said switch is moved into engagement with the contact L, the lamp L' in the left hand compartment of each signal box will be simultaneously turned on. In the same manner, when the arm of the switch is brought into engagement with the contact R, the lamp R' in the right hand compartment of each box is turned on, while upon bringing the switch arm into engagement with the contact S, the lamp S' in the top compartment of each box will be turned on. In this way, the same signal will be shown on all three boxes, and anyone seeing the red arrow on anyone of said boxes illuminated will know that a turn to the right is to be made, while if the green arrow is illuminated it will indicate that a turn to the left is contemplated. Likewise, when the word "Stop" is illuminated its meaning will be immediately understood by anyone seeing either of the boxes.

When the separate switch controlling the circuit to the lamps BS and BR is turned on by the driver of the automobile, the front lamps BS will flash for a moment while the switch K is being opened by the action of the solenoid J which is energized when said separate switch is turned on to close said circuit. This flashing of the lamps BS will indicate to the driver that the rear or tail lamp BR is working properly, so that it is unnecessary for the driver to leave his seat for this purpose. As already described, whenever said rear lamp BR goes out, the switch K will automatically close the circuit to the lamps BS, causing said lamps BS to light up, thereby notifying the driver that the tail lamp is out.

Having thus described our invention, what we claim as new and desire to secure by Letters Patent of the United States is:—

1. The combination with a plurality of signal boxes, each having a plurality of compartments, electric lamps in said compartments, a generator, a switch board having a plurality of groups of sockets, electric connections from one pole of the generator to one of the sockets of each group, a single switch having a plurality of contacts, electric connections from each of said contacts to another one of the sockets in each group, electric connections from the arm of the switch to the other pole of the generator, and a plurality of plugs, each carrying conductors from the lamps in the compartments of a different one of said boxes, each plug also having a plurality of fingers adapted to engage the sockets of one of the groups in the switch board for placing said lamps in circuit with the switch and generator.

2. The combination with a plurality of signal boxes, each having a plurality of compartments, electric lamps in said compartments, a generator, a switch board having a plurality of groups of sockets, electric connections from one pole of the generator to one of the sockets of each group, a single switch having a plurality of contacts, electric connections from each of said contacts to another one of the sockets in each group, electric connections from the arm of the switch to the other pole of the generator, electric connections from the second pole of the generator to another one of the sockets in each group, and a plurality of plugs, each carrying conductors from the lamps in the different ones of the compartments of said boxes, each plug also having a plurality of fingers adapted to engage the sockets of one of the groups in the switch board for placing certain of said lamps in each box in circuit with the switch and one lamp in each box in direct circuit with the generator.

3. The combination with a plurality of signal boxes, each having a plurality of compartments, electric lamps in said compartments, a generator, a switch board having a plurality of groups of sockets, electric connections from one pole of the generator to one of the sockets of each group, a single switch having a plurality of contacts, electric connections from each of said contacts to another one of the sockets in each group, electric connections from the arm of the switch to the other pole of the generator, electric connections from the second pole of the generator to another one of the sockets in each group, and a plurality of plugs, each carrying conductors from the lamps in the different ones of the compartments of said boxes, each plug also having a plurality of fingers adapted to engage the sockets of one of the groups in the switch board for placing certain of said lamps in each box in circuit with the switch and one lamp in each box in direct circuit with the generator, there being a switch in the part of the conductor which runs from the second pole of the generator to the sockets in certain of said groups and a solenoid in the part of said conductor which runs to the socket in another of said groups, the circuit in the latter part of said conductor being normally closed, and the solenoid being connected to the switch in the other part of said conductor for normally holding that part open, and means for automatically closing said last named switch when the circuit to the solenoid is opened.

In testimony whereof we have signed our names to this specification in the presence of two attesting witnesses.

EDWIN T. GRAY.
ALFRED T. HOEVET.

Witnesses:
Wm. M. Christie,
E. Steuernagel.